US012668523B2

(12) United States Patent
Mitchell

(10) Patent No.: US 12,668,523 B2
(45) Date of Patent: Jun. 30, 2026

(54) K₂O-CONTAINING DISPLAY GLASSES

(71) Applicant: CORNING INCORPORATED, Corning, NY (US)

(72) Inventor: Alexandra Lai Ching Kao Andrews Mitchell, Ithaca, NY (US)

(73) Assignee: CORNING INCORPORATED, Corning, NY (US)

( * ) Notice: Subject to any disclaimer, the term of this patent is extended or adjusted under 35 U.S.C. 154(b) by 761 days.

(21) Appl. No.: 17/918,139

(22) PCT Filed: Mar. 29, 2021

(86) PCT No.: PCT/US2021/024605
§ 371 (c)(1),
(2) Date: Oct. 11, 2022

(87) PCT Pub. No.: WO2021/211284
PCT Pub. Date: Oct. 21, 2021

(65) Prior Publication Data
US 2023/0133052 A1    May 4, 2023

Related U.S. Application Data

(60) Provisional application No. 63/009,102, filed on Apr. 13, 2020.

(51) Int. Cl.
*C03C 3/083* (2006.01)
*C03C 3/085* (2006.01)
(Continued)

(52) U.S. Cl.
CPC .............. *C03C 3/083* (2013.01); *C03C 3/085* (2013.01); *C03C 3/089* (2013.01); *C03C 3/091* (2013.01)

(58) Field of Classification Search
None
See application file for complete search history.

(56) References Cited

U.S. PATENT DOCUMENTS 4,303,446 A * 12/1981 LaCourse ............... C03C 3/089
501/65
5,480,846 A * 1/1996 Sundberg ............... C03C 3/089
501/72
(Continued)

FOREIGN PATENT DOCUMENTS

CN       102574724 A    7/2012
CN       102574726 A    7/2012
(Continued)

OTHER PUBLICATIONS

Yamashita et al., "Nuclear magnetic resonance studies of 0.139MO (or M'2O)•0.673SiO2•(0.188-x)Al2O3•xB2O3 (M=Mg, Ca, Sr and Ba, M'=Na and K) glasses," Journal of Non-Crystalline Solids 331 (2003), pp. 128-136 ("Yamashita") (Year: 2003).*
(Continued)

*Primary Examiner* — Amber R Orlando
*Assistant Examiner* — Paul Alan Forsyth

(57) ABSTRACT

A glass composition includes about 60 mol. % to about 80 mol. % SiO₂, 0 mol. % to about 11 mol. % Al₂O₃, about 4.0 mol. % to about 12 mol. % B₂O₃, about 0.5 mol. % to about 20 mol. % of K₂O, 0 mol. % to about 18.5 mol. % MgO, and 0 mol. % to about 1 mol. % SnO₂. The glass composition has a range of CTE, which can be adjusted based on the composition, and can be used for display applications.

20 Claims, 2 Drawing Sheets

(51) Int. Cl.
    *C03C 3/089*       (2006.01)
    *C03C 3/091*       (2006.01)

(56)         References Cited

U.S. PATENT DOCUMENTS

| | | | |
|---|---|---|---|
| 6,403,694 B1 | 6/2002 | Tose et al. | |
| 2007/0293618 A1 | 12/2007 | Barkac et al. | |
| 2009/0239008 A1* | 9/2009 | Ovutthitham | C03C 3/095 |
| | | | 501/64 |
| 2010/0300536 A1* | 12/2010 | Aitken | C03C 3/089 |
| | | | 501/72 |
| 2011/0062849 A1* | 3/2011 | Carlson | C03C 15/00 |
| | | | 428/141 |
| 2013/0093312 A1* | 4/2013 | Ono | C03C 3/091 |
| | | | 313/489 |
| 2014/0050911 A1 | 2/2014 | Mauro et al. | |
| 2017/0174556 A1* | 6/2017 | Miyabe | C03C 3/093 |
| 2022/0298055 A1 | 9/2022 | Gross et al. | |
| 2022/0324745 A1 | 10/2022 | Gross et al. | |

FOREIGN PATENT DOCUMENTS

| | | | |
|---|---|---|---|
| JP | 08-225384 A | 9/1996 | |
| JP | 11-310429 A | 11/1999 | |
| JP | 2000-243137 A | 9/2000 | |
| JP | 2012-528072 A | 11/2012 | |
| KR | 10-2015-0107703 A | 9/2015 | |
| WO | 2010/138784 A2 | 12/2010 | |
| WO | 2016/159344 A1 | 10/2016 | |

OTHER PUBLICATIONS

Du et al., "Network connectivity in aluminoborosilicate glasses: A high-resolution 11B, 27Al and 17O NMR study," Journal of Non-Crystalline Solids 351 (2005), pp. 3508-3520 ("Du") (Year: 2005).*

Korean Patent Application No. 10-2022-7039489 , Notice of Allowance dated Mar. 19, 2025, 3 pages (English Translation only), Korean Patent Office.

International Search Report and Written Opinion of the International Searching Authority; PCT/US2021/024605; dated Jul. 8, 2021; 11 pages; European Patent Office.

Howard A. Robinson, "Viscosity of Recent Container Glass", the Journal of the American Society, May 1994, vol. 27, No. 5, pp. 121-138.

Chinese Patent Application No. 202311501878.9 , Office Action dated Oct. 30, 2025, 4 pages (English Translation only), Chinese Patent Office.

Japanese Patent Application No. 2022-562115, Office Action dated Feb. 26, 2025, 6 pages (English Translation only), Japanese Patent Office.

Vosburgh et al., "Optical absorption spectra of gold nano-clusters in potassium borosilicate glass", Journal of Non-Crystalline Solids, vol. 349, 2004, pp. 309-314.

* cited by examiner

K₂O-CONTAINING DISPLAY GLASSES

CROSS-REFERENCE TO RELATED APPLICATIONS

This application is a national stage entry of International Patent Application Serial No. PCT/US2021/024605, filed on Mar. 29, 2021, which in turn, claims the benefit of priority under 35 U.S.C. § 119 of U.S. Provisional Application Ser. No. 63/009,102 filed on Apr. 13, 2020, the contents of each of which are is relied upon and incorporated herein by reference in their entireties.

FIELD

The disclosure relates to glass composition generally. More particularly, the disclosed subject matter relates to glass compositions comprising alkali metal and suitable for use in display applications.

BACKGROUND

Flat or curved substrates made of an optically transparent material such as glass are used for flat panel display, photovoltaic devices, and other suitable applications. In addition to the requirement for optical clarity, glass compositions need to meet different challenges depending on fabrication process and the applications.

For example, the production of liquid crystal displays such as active matrix liquid crystal display devices (AMLCDs) is complex, and the properties of the substrate glass are important. The glass substrates used in the production of AMLCD devices need to have their physical dimensions tightly controlled. The downdraw sheet drawing processes and, in particular, the fusion process, are capable of producing glass sheets that can be used as substrates without requiring costly post-forming finishing operations such as lapping and polishing. However, the fusion process places rather severe restrictions on the glass properties, which require relatively high liquidus viscosities.

In the liquid crystal display field, thin film transistors (TFTs) may be based on poly-crystalline silicon (p-Si) or amorphous silicon (a-Si). Amorphous silicon offers advantages such as lower processing temperature. Sometimes poly-crystalline silicon is preferably used because of their ability to transport electrons more effectively. Poly-crystalline based silicon transistors are characterized as having a higher mobility than those based on amorphous-silicon based transistors. This allows the manufacture of smaller and faster transistors, which ultimately produces brighter and faster displays. One problem with p-Si based transistors is that their manufacture requires higher process temperatures than those employed in the manufacture of a-Si transistors. These temperatures range from 450° C. to 600° C. compared to the 350° C. peak temperatures employed in the manufacture of a-Si transistors.

The glass compositions used for display applications need to have good thermal and mechanical properties, and dimensional stability satisfying the processing and performance requirements. In addition, diffusion of metal ions into the thin film transistors may cause damages to the transistors. Such diffusion needs to be minimized or eliminated.

SUMMARY

The present disclosure provides a glass composition comprising alkali metal such as potassium, a method of making the same, and a method of using the same. The present disclosure also provides a glass substrate comprising such a glass composition, and a display device comprising such a glass composition or a glass substrate having such a glass composition.

In accordance with some embodiments, a glass composition consists essentially of:

about 60 mol. % to about 80 mol. % SiO₂;

0 mol. % to about 11 mol. % Al₂O₃;

about 4.0 mol. % to about 12 mol. % B₂O₃;

about 0.5 mol. % to about 20 mol. % of K₂O;

0 mol. % to about 18.5 mol. % MgO; and 0 mol. % to about 1 mol. % SnO₂.

In the composition, the ingredients are selected from the six oxides above. In some embodiments, K₂O is the only alkali metal oxide added, and does not include or is substantially free of other alkali metal oxides such as Li₂O and Na₂O. MgO is the only alkaline earth metal oxide added, and does not include or is substantially free of CaO, SrO, or BaO.

In the glass composition, SiO₂ is present in any suitable range. Examples of a suitable range include, but are not limited to, about 60 mol. % to about 75 mol. %, about 65 mol. % to about 80 mol. %, or about 65 mol. % to about 75 mol. %. In some embodiments, the content of SiO₂ is equal to or less than 75 mol. %, for example, in a range of about 60 mol. % to about 75 mol. %.

In some embodiments, Al₂O₃ has a content equal to or lower than 11 mol. %. Examples of a suitable range of Al₂O₃ include, but are not limited to, about 0.1 mol. % to about 10.5 mol. %, about 0.1 mol. % to about 2 mol. %, about 2 mol. % to about 10.5 mol. %, about 4 mol. % to about 10.5 mol. %, or any other suitable range.

In some embodiments, the alkali metal oxide is K₂O, having a content in any suitable range. Examples of a suitable range of K₂O include, but are not limited to, about 0.5 mol. % to about 15 mol. %, about 1 mol. % to about 15 mol. %, about 3.5 mol. % to about 15 mol. %, about 3 mol. % to about 15 mol. %, or about 3 mol. % to about 10 mol. %.

Examples of a suitable range of MgO include, but are not limited to, 0 mol. % to about 15 mol. %, 0 mol. % to about 10 mol. %, 0 mol. % to about 6 mol. %, 0.1 mol. % to about 15 mol. %, about 0.1 mol. % to about 10 mol. %, 0.1 mol. % to about 0.6 mol. %, or about 10 mol. % to about 18.5 mol. %. In some embodiments, MgO has a content equal to or lower than 6 mol. %, for example, in a range of 0 mol. % to about 2 mol. %. In some embodiments, MgO has a content equal to or higher than 10 mol. %, for example, in range of about 10 mol. % to about 18.5 mol. %, or about 16 mol. % to about 18.5 mol. %.

Examples of a suitable range of B₂O₃ include, but are not limited to, about 4.9 mol. % to about 11.5 mol. %, from about 6 mol. % to about 11 mol. %, or from about 8 mol. % to about 11 mol. %.

The composition may comprise any other suitable ingredients such as SnO₂. Examples of a suitable range of SnO₂ include, but are not limited to, about 0.01 mol. % to about 0.5 mol. %, or from about 0.05 mol. % to about 0.15 mol. %.

The present disclosure provides any suitable composition with different combinations of the ingredients and content ranges as described herein.

In some embodiments, a molar ratio of K₂O/Al₂O₃ is in a range of from about 0.4 to about 360, for example, from about 0.4 to about 2, from about 1 to about 10, from about 1 to about 100, from about 100 to about 200, or from about 200 to about 360. In some embodiments, the ratio $K_2O/Al_2O_3$ is in a range from about 1 to about 10, for example, from about 0.4 to about 2.

In some embodiments, a molar ratio of $MgO/Al_2O_3$ is in a range of 0 to about 10, for example, from 0 to about 4, or from 0 to about 1. The molar ratio of $SiO_2/B_2O_3$ (k) might be in a range of about 6 to about 15.

In some embodiments, a R' value defined as $([K_2O]—[Al_2O_3])/[B_2O_3]$ is in a range of from about –0.7 to about 0.7, and a R" value defined as $([K_2O]+0.5*[MgO]—[Al_2O_3])/[B_2O_3]$ is in a range of from about –0.3 to about 1.3. $[K_2O]$, $[MgO]$, $[Al_2O_3]$, and $[B_2O_3]$ represent a molar content of $K_2O$, $MgO$, $Al_2O_3$, and $B_2O_3$, respectively.

In some embodiments, the glass composition has a low coefficient of thermal expansion (CTE) in a range of from about $40\times10^{-7}/° C.$ to about $85\times10^{-7}/° C.$ at a temperature from 20° C. to 300° C. The CTE can be adjustable for different applications, based on the composition. For example, the CTE is in a range of from about $40\times10^{-7}/° C.$ to about $80\times10^{-7}/° C.$, or from about $40\times10^{-7}/° C.$ to about $70\times10^{-7}/° C.$, from about $40\times10^{-7}/° C.$ to about $60\times10^{-7}/° C.$, from about $30\times10^{-7}/° C.$ to about $40\times10^{-7}/° C.$, or from about $30\times10^{-7}/° C.$ to about $50\times10^{-7}/° C.$ In some embodiments, an exemplary glass composition comprises consists essentially of:
  about 60 mol. % to about 75 mol. % $SiO_2$;
  about 4 mol. % to about 10.5 mol. % $Al_2O_3$;
  about 5 mol. % to about 11 mol. % $B_2O_3$;
  about 3.5 mol. % to about 15 mol. % of $K_2O$;
  0 mol. % to about 6 mol. % MgO; and
  0 mol. % to about 1 mol. % $SnO_2$,
  wherein a molar ratio of $K_2O/Al_2O_3$ is in a range of from about 0.4 to about 2, and a molar ratio of $MgO/Al_2O_3$ is in a range of 0 to about 4.

In some embodiments, the molar ratio of $SiO_2/B_2O_3$ (k) might be in a range of about 6 to about 15. a R' value defined as $([K_2O]—[Al_2O_3])[B_2O_3]$ is in a range of from about –0.7 to about 0.7, and a R" value defined as $([K_2O]+0.5*[MgO]—[Al_2O_3])/[B_2O_3]$ is in a range of from about –0.3 to about 1.3. $[K_2O]$, $[MgO]$, $[Al_2O_3]$, and $[B_2O_3]$ represent a molar content of $K_2O$, $MgO$, $Al_2O_3$, and $B_2O_3$, respectively.

In another aspect, the present disclosure also provides a method of making and a method of using the glass composition described herein, a glass article (or component) comprising such a glass composition, and a display device comprising the glass composition or a glass article having the glass composition.

Examples of a glass article include, but are not limited to a panel, a substrate, a cover, a backplane, and any other components used in an electronic device for display applications. For example, in some embodiments, the glass composition or the glass substrate is a cover or backplane in an electronic device. In some embodiments, thin film resistors are built on or in contact with the glass composition. Examples of the electronic devices include, but are not limited to, liquid crystal display (LCD), light emitting diode (LED) display, computer monitors, automated teller machines (ATMs), touch screen, and photovoltaic devices.

BRIEF DESCRIPTION OF THE DRAWINGS

The present disclosure is best understood from the following detailed description when read in conjunction with the accompanying drawings. It is emphasized that, according to common practice, these drawings are for illustrations of some embodiments only.

DETAILED DESCRIPTION

Figure 1:
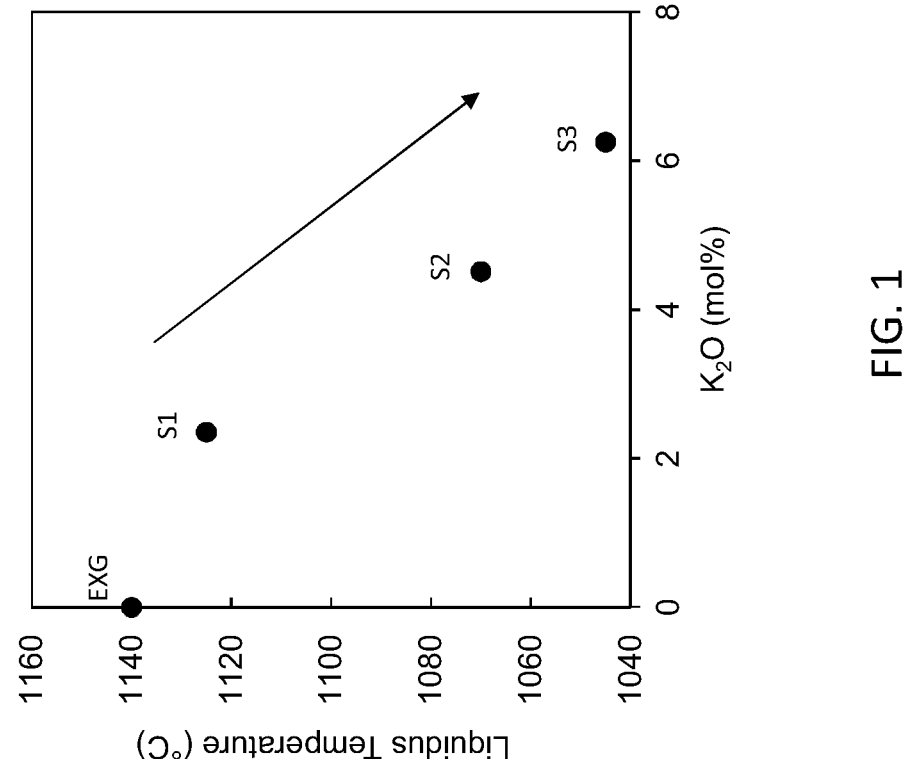
FIG. 1 graphically depicts an exemplary relationship between the content of alkali oxide (e.g., $K_2O$) and the liquidus temperature of exemplary glass compositions in accordance with some embodiments.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

For purposes of the description hereinafter, it is to be understood that the embodiments described below may assume alternative variations and embodiments. It is also to be understood that the specific articles, compositions, and/or processes described herein are exemplary and should not be considered as limiting.

In the present disclosure the singular forms "a," "an," and "the" include the plural reference, and reference to a particular numerical value includes at least that particular value, unless the context clearly indicates otherwise. When values are expressed as approximations, by use of the antecedent "about," it will be understood that the particular value forms another embodiment. As used herein, "about X" (where X is a numerical value) preferably refers to ±10% of the recited value, inclusive. For example, the phrase "about 8" preferably refers to a value of 7.2 to 8.8, inclusive. Where present, all ranges are inclusive and combinable. For example, when a range of "1 to 5" is recited, the recited range should be construed as including ranges "1 to 4", "1 to 3", "1-2", "1-2 & 4-5", "1-3 & 5", "2-5", and the like. In addition, when a list of alternatives is positively provided, such listing can be interpreted to mean that any of the alternatives may be excluded, e.g., by a negative limitation in the claims. For example, when a range of "1 to 5" is recited, the recited range may be construed as including situations whereby any of 1, 2, 3, 4, or 5 are negatively excluded; thus, a recitation of "1 to 5" may be construed as "1 and 3-5, but not 2", or simply "wherein 2 is not included." It is intended that any component, element, attribute, or step that is positively recited herein may be explicitly excluded in the claims, whether such components, elements, attributes, or steps are listed as alternatives or whether they are recited in isolation.

The terms "substantial," "substantially," and variations thereof as used herein are intended to note that a described feature is equal or approximately equal to a value or description. Moreover, "substantially similar" is intended to denote that two values are equal or approximately equal. In some embodiments, "substantially similar" may denote values within about 10% of each other, such as within about 5% of each other, or within about 2% of each other.

The present disclosure provides a glass composition comprising oxides of alkali metal such as potassium, a method of making the same, and a method of using the same. The present disclosure also provides a glass substrate or article comprising such a glass composition, and a display device comprising such a glass composition or a glass substrate having such a glass composition. Such a glass composition comprises the ingredients as described herein, including a low content of $Al_2O_3$, and an alkali metal oxide such as $K_2O$. In some embodiments, $K_2O$ is the only alkali metal oxide in the composition. As described herein, the inventors have surprisingly found that such a glass composition comprising alkali metal oxide and a low content of $Al_2O_3$ provides low liquidus temperature, high liquidus viscosity, a low and adjustable coefficient of thermal expansion, and good mechanical properties. The inventors have also surprisingly found that no diffusion of metal ions such as alkali metal ions such as $K^+$ from the glass composition exists when the composition is used in electronic devices. Any possible contamination caused by diffusion of alkali metals with ionic radii equivalent to K or greater can be minimized or eliminated.

Unless expressly indicated otherwise, the term "glass article" or "glass" used herein is understood to encompass any object made wholly or partly of glass. Glass articles include monolithic substrates, or laminates of glass and glass, glass and non-glass materials, glass and crystalline materials, and glass and glass-ceramics (which include an amorphous phase and a crystalline phase).

The glass article such as a glass panel may be flat or curved and is transparent or substantially transparent. As used herein, the term "transparent" is intended to denote that the article, at a thickness of approximately 1 mm, has a transmission of greater than about 85% in the visible region of the spectrum (400-700 nm). For instance, an exemplary transparent glass panel may have greater than about 85% transmittance in the visible light range, such as greater than about 90%, greater than about 95%, or greater than about 99% transmittance, including all ranges and subranges therebetween. According to various embodiments, the glass article may have a transmittance of less than about 50% in the visible region, such as less than about 45%, less than about 40%, less than about 35%, less than about 30%, less than about 25%, or less than about 20%, including all ranges and subranges therebetween. In certain embodiments, an exemplary glass panel may have a transmittance of greater than about 50% in the ultraviolet (UV) region (100-400 nm), such as greater than about 55%, greater than about 60%, greater than about 65%, greater than about 70%, greater than about 75%, greater than about 80%, greater than about 85%, greater than about 90%, greater than about 95%, or greater than about 99% transmittance, including all ranges and subranges therebetween.

Exemplary glasses can include, but are not limited to, aluminosilicate, alkali-aluminosilicate, borosilicate, alkali-borosilicate, aluminoborosilicate, alkali-aluminoborosilicate, and other suitable glasses. In some embodiments, the glass article may be strengthened mechanically by utilizing a mismatch of the coefficient of thermal expansion between portions of the article to create a compressive stress region and a central region exhibiting a tensile stress. In some embodiments, the glass article may be strengthened thermally by heating the glass to a temperature above the glass transition point and then rapidly quenching. In some other embodiments, the glass article may be chemically strengthening by ion exchange.

In some embodiments, the glass compositions described herein are alkaline earth alumino-silicate glass compositions, which include a combination of $SiO_2$, $Al_2O_3$, one alkaline earth oxide, and $K_2O$ as the only alkali metal oxide. In some embodiments, MgO is the one alkaline earth oxide in the composition. The glass compositions described herein have an amorphous structure. Crystalline or polycrystalline structures may be also made using the compositions.

The term "softening point," as used herein, refers to the temperature at which the viscosity of the glass composition is $1 \times 10^{7.6}$ poise. The softening point is measured using the method of parallel plate viscosity.

The term "annealing point," as used herein, refers to the temperature at which the viscosity of the glass composition is $1 \times 10^{13.18}$ poise.

The terms "strain point" and "$T_{strain}$" as used herein, refers to the temperature at which the viscosity of the glass composition is $10^{14.68}$ poise.

The liquidus temperature of a glass ($T_{liq}$) is the temperature (° C.) above which no crystalline phases can coexist in equilibrium with the glass. The liquidus viscosity is the viscosity of a glass at the liquidus temperature.

The term "CTE," as used herein, refers to the coefficient of thermal expansion of the glass composition over a temperature range from about room temperature (RT) to about 300° C.

The fracture toughness may be measured using known methods in the art, for example, using a chevron notch, short bar, notched beam and the like, according to ASTM C1421-10, "Standard Test Methods for Determination of Fracture Toughness of Advanced Ceramics at Ambient Temperature".

For the purposes of the present disclosure, blunted crack tips can be quantified by a reduction in the value accounting for flaw geometry in the following equation relating fracture toughness to stress at failure for mode I crack opening of surface cracks in a finite solid:

$$K_{IC} = \sigma_f \sqrt{\text{square root over } (\Omega \pi a)} \qquad \text{Equation (1)}$$

where $K_{IC}$ is the fracture toughness, a material constant, $\sigma_f$ is the measured stress at failure, $\Omega$ accounts for flaw geometry, free-surface effects, and form of loading, and a is the flaw depth.

Average loads and stresses at failure for the samples were characterized. Also included are values for the expression $\sqrt{\text{square root over } (\Omega \pi a)}$ from Equation (1) above, as calculated from the failure data and the known fracture toughness of the glass for which the composition was provided above (about 0.7 $MPa^{0.5}$, as measured by the Chevron notch test, where m is in units of meters). As noted above, that expression corresponds in Equation (1) to the ratio of the fracture toughness $K_{IC}$ of the glass (in units of $MPa \cdot m^{0.5}$) to the measured stresses at failure $\sigma_f$ (in units of MPa) of each of the samples of that glass. Since the value of $\sqrt{\text{square root over } (\Omega \pi a)}$ (in units of $m^{0.5}$) takes into account both flaw depth (a) and flaw "shape" ($\Omega$), that value directly reflects the effects of the presently disclosed treatments on the flaw configuration factors affecting the propagation characteristics of the strength-limiting surface flaws that cause stress failures in surface-flawed glass sheets.

In the embodiments of the glass compositions described herein, the concentrations of constituent components (e.g., $SiO_2$, $Al_2O_3$, and the like) are specified in mole percent (mol. %) on an oxide basis, unless otherwise specified.

The terms "free" and "substantially free," when used to describe the concentration and/or absence of a particular constituent component in a glass composition, means that the constituent component is not intentionally added to the glass composition. However, the glass composition may contain traces of the constituent component as a contaminant or tramp in amounts of less than 0.01 mol. %.

The present disclosure provides a glass composition comprising alkali metal such as potassium, a method of making the same, and a method of using the same. The present disclosure also provides a glass substrate comprising such a glass composition, and a display device comprising such a glass composition or a glass substrate having such a glass composition.

The present disclosure provides a novel glass composition intended for display glass applications. Based on conventional wisdom, alkali metal such as $Li_2O$, $Na_2O$, $K_2O$, $Rb_2O$, and $Cs_2O$ are forbidden in display glass compositions due to potential diffusion of the alkali into the electronics during high temperature downstream processes including thin film transistor (TFT) deposition. The inventor has recently found that oxides of an alkali metal having large ionic radius such as $K_2O$ can be used in display glass compositions without diffusion. Diffusion does not occur from the glass substrate into the overlying $SiO_2$ or SiNx barrier layers that are deposited as the first layer on the glass substrate.

In accordance with some embodiments, a glass composition consists essentially of:

about 60 mol. % to about 80 mol. % $SiO_2$;
0 mol. % to about 11 mol. % $Al_2O_3$;
about 4.0 mol. % to about 12 mol. % $B_2O_3$;
about 0.5 mol. % to about 20 mol. % of $K_2O$;
0 mol. % to about 18.5 mol. % MgO; and
0 mol. % to about 1 mol. % $SnO_2$.

In the composition, the ingredients are selected from the six oxides above. In some embodiments, these six oxides are the only ingredients. $K_2O$ is the only alkali metal oxide added, and does not include or is substantially free of other alkali metal oxides such as $Li_2O$ and $Na_2O$. MgO is the only alkaline earth metal oxide added, and does not include or is substantially free of CaO, SrO, or BaO.

In the embodiments of the glass compositions described herein, $SiO_2$ is the largest constituent of the composition and, as such, is the primary constituent of the glass network.

In the glass composition, $SiO_2$ is present in any suitable range. Examples of a suitable range include, but are not limited to, about 60 mol. % to about 75 mol. %, about 65 mol. % to about 80 mol. %, or about 65 mol. % to about 75 mol. %. In some embodiments, the content of $SiO_2$ is equal to or less than 75 mol. %, for example, in a range of about 60 mol. % to about 75 mol. %.

The glass compositions described herein further optionally include $Al_2O_3$, at a relatively low content. In some embodiments, $Al_2O_3$ has a content equal to or lower than 11 mol. %. Examples of a suitable range of $Al_2O_3$ include, but are not limited to, about 0.1 mol. % to about 10.5 mol. %, 0.1 mol. % to about 2 mol. %, about 2 mol. % to about 10.5 mol. %, about 4 mol. % to about 15 mol. %, or any other suitable range.

The glass compositions in the embodiments described herein also include an alkali metal oxide. Preferably, the alkali metal oxide is $K_2O$, which is the only alkali oxide added. $K_2O$ may have a content in any suitable range. Examples of a suitable range of $K_2O$ include, but are not limited to, about 0.5 mol. % to about 15 mol. %, about 1 mol. % to about 15 mol. %, about 3.5 mol. % to about 15 mol. %, about 3 mol. % to about 15 mol. %, or about 3 mol. % to about 10 mol. %.

$Al_2O_3$, when present, may act in a manner similar to $SiO_2$ and may increase the viscosity of the glass composition when in a tetrahedral coordination in a glass melt formed from the glass composition. However, as described in U.S. Pat. No. 10,112,865, it was thought that the presence of $Al_2O_3$ in the glass compositions would increases the mobility of alkali constituents in the glass components, and the amount of $Al_2O_3$ in the glass compositions needs to be carefully considered.

In U.S. Provisional Application No. 62/856,170 filed Jun. 3, 2019, and U.S. Provisional Application No. 62/886,687 filed Aug. 14, 2019, the inventors have surprisingly found that a high content of $Al_2O_3$, in conjunction with alkali oxides present in the glass compositions, reduces the propensity of alkali constituents from diffusion or leaching out of the glass, or maintain the alkali constituents in the composition under processing conditions on which thin film transistors are formed in or on a substrate comprising the glass composition.

The inventor of the present disclosure has further surprisingly found that zero percent or a low content of $Al_2O_3$, in conjunction with $K_2O$ and other ingredients as disclosed herein present in the glass compositions, also reduces the propensity of alkali constituents from diffusion or leaching out of the glass, or maintain the alkali constituents in the composition under processing conditions, on which thin film transistors are formed in or on a substrate comprising the glass composition. In addition, the glass composition having alkali oxides such as $K_2O$ has a relatively low but adjustable thermal expansion. The related coefficient of thermal expansion (CTE) can be tailored or adjusted based on the ratio of the ingredients.

$K_2O$ is used as the primary alkali oxide constituent as the relatively large ionic radius of K, compared to Na or Li, decreases the diffusivity of the alkali metal in the glass. Low diffusivity of alkali metals from the glass into overlying barrier layers is very important when the glass composition is used to form backplanes for displays because the diffusion of alkali metal from the glass to thin film transistors deposited on the glass damages the transistors.

In some embodiments, $K_2O$ is a flux and is used to lower the liquidus temperature, making the glass more manufacturable. $K_2O$ also increases the range of the coefficient of thermal expansion (CTE) to include from low, to intermediate to high CTE glass composition.

The glass compositions in the embodiments described herein further comprise $B_2O_3$. Like $SiO_2$ and $Al_2O_3$, $B_2O_3$ contributes to the formation of the glass network. In some embodiments, $B_2O_3$ may be added to a glass composition to decrease the viscosity of the glass composition. In the embodiments described herein, $B_2O_3$ is present in the glass compositions in an amount. Examples of a suitable range of $B_2O_3$ include, but are not limited to, about 4.9 mol. % to about 11.5 mol. %, from about 6 mol. % to about 11 mol. %, or from about 8 mol. % to about 11 mol. %.

The composition provided in the present disclosure may optionally include alkaline earth metal oxide such as MgO. In some embodiments, MgO is the only alkaline earth metal oxide added. Examples of a suitable range of MgO include, but are not limited to, 0 mol. % to about 15 mol. %, 0 mol. % to about 10 mol. %, 0 mol. % to about 6 mol. %, about 0.1 mol. % to about 10 mol. %, 0.1 mol. % to about 0.6 mol. %, or about 10 mol. % to about 18.5 mol. %. In some embodiments, MgO has a content equal to or lower than 6 mol. %, for example, in a range of 0 mol. % to about 2 mol. %. In some embodiments, MgO has a content equal to or higher than 10 mol. %, for example, in range of about 10 mol. % to about 18.5 mol. %, or about 16 mol. % to about 18.5 mol. %. MgO has a high field strength and is used to increase the modulus of the glass composition.

The composition may comprise any other suitable ingredients such as $SnO_2$. Examples of a suitable range of $SnO_2$ include, but are not limited to, about 0.01 mol. % to about 0.5 mol. %, or from about 0.05 mol. % to about 0.15 mol. %.

The present disclosure provides any suitable composition with different combinations of the ingredients and content ranges as described herein.

In some embodiments, a molar ratio of $K_2O/Al_2O_3$ is in a range of from about 0.4 to about 360, for example, from about 0.4 to about 2, from about 1 to about 10, from about 1 to about 100, from about 100 to about 200, or from about 200 to about 360. In some embodiments, the ratio $K_2O/Al_2O_3$ is in a range from about 1 to about 10, for example, from about 0.4 to about 2.

In some embodiments, a molar ratio of $MgO/Al_2O_3$ is in a range of 0 to about 10, for example, from 0 to about 4, or from 0 to about 1. The molar ratio of $SiO_2/B_2O_3$ (k) might be in a range of about 6 to about 15.

In some embodiments, a R' value defined as $([K_2O]—[Al_2O_3])/[B_2O_3]$ is in a range of from about −0.7 to about 0.7, and a R" value defined as $([K_2O]+0.5*[MgO]—[Al_2O_3])/[B_2O_3]$ is in a range of from about −0.3 to about 1.3. $[K_2O]$, $[MgO]$, $[Al_2O_3]$, and $[B_2O_3]$ represent a molar content of $K_2O$, MgO, $Al_2O_3$, and $B_2O_3$, respectively. The ranges of the R' and R' values indicate the ratio of alkali and alkaline earth cations that that are remaining after charge balancing the $Al_2O_3$ for conversion of $B_2O_3$ from trigonal planar to tetragonal. The higher the R' and R" ratios, the more boron that will be present in the glass as IV-coordinated boron, which increases the Yong's modulus of the glass composition.

The glass composition can have properties including from low to intermediate Young's modulus, refraction index, density, strain point, annealing point, and softening point. These properties are relevant and important to display applications.

In some embodiments, the glass composition has a coefficient of thermal expansion (CTE) in a range of from about $40\times10^{-7}/°$ C. to about $85\times10^{-7}/°$ C. at a temperature from $20°$ C. to $300°$ C. The CTE can be adjustable for different applications, based on the composition. For example, the CTE is in a range of from about $40\times10^{-7}/°$ C. to about $80\times10^{-7}/°$ C., or from about $40\times10^{-7}/°$ C. to about $70\times10^{-7}/°$ C., from about $40\times10^{-7}/°$ C. to about $60\times10^{-7}/°$ C., from about $30\times10^{-7}/°$ C. to about $40\times10^{-7}/°$ C., or from about $30\times10^{-7}/°$ C. to about $50\times10^{-7}/°$ C. The range of the CTE is advantageous for CTE matching to a broad range of materials, including TFTs at the low end of CTE spectrum, and alumina and metals such as Ti at the high end of the CTE range. Such CTE variation can be utilized if these glasses are used in a laminate structure to create compressive stress due to CTE mismatches during cooling.

The present disclosure provides any suitable composition with different combinations of the ingredients and content ranges as described herein.

In some embodiments, an exemplary glass composition comprises consists essentially of:

about 60 mol. % to about 75 mol. % $SiO_2$;
about 4 mol. % to about 10.5 mol. % $Al_2O_3$;
about 5 mol. % to about 11 mol. % $B_2O_3$;

about 3.5 mol. % to about 15 mol. % of $K_2O$;
0 mol. % to about 6 mol. % MgO; and
0 mol. % to about 1 mol. % $SnO_2$,
wherein a molar ratio of $K_2O/Al_2O_3$ is in a range of from about 0.4 to about 2, and a molar ratio of $MgO/Al_2O_3$ is in a range of 0 to about 4.

In some embodiments, the molar ratio of $SiO_2/B_2O_3$ (k) might be in a range of about 6 to about 15. The composition has a R' value defined as $([K_2O]—[Al_2O_3])/[B_2O_3]$, which is in a range of from about −0.7 to about 0.7, and a R" value defined as $([K_2O]+0.5*[MgO]—[Al_2O_3])/[B_2O_3]$, which is in a range of from about −0.3 to about 1.3. $[K_2O]$, $[MgO]$, $[Al_2O_3]$, and $[B_2O_3]$ represent a molar content of $K_2O$, MgO, $Al_2O_3$, and $B_2O_3$, respectively.

The glass composition provides both processing and performance advantages. For example, the glass composition has a low liquidus temperature ($T_{liq}$) and high liquidus viscosity. The liquidus temperature may be equal to or less than $1,300°$ C., for example, in a range of about $900°$ C. to $1,300°$ C., about $950°$ C. to $1,300°$ C. or about $1,000°$ C. to $1,200°$ C., about $900°$ C. to $1,185°$ C., or about $1,000°$ C. to $1,185°$ C., about $900°$ C. to $1,150°$ C., or about $1,000°$ C. to $1,150°$ C. In some embodiments, the liquidus temperature is lower than $950°$ C.

The glass composition has a liquidus viscosity equal to or higher than 100 kPoise, for example, in a range of from about 200 kPoise to about 400 kPoise, from about 200 kPoise to about 600 kPoise, or from about 200 kPoise to about 800 kPoise. In some embodiments, the liquidus viscosity may be in the range of from 100 kPoise to 800 kPoise, for example, from about 100 kPoise to about 550 kPoise, or from about 200 kPoise to about 450 kPoise.

The glass composition disclosed herein have a refractive index at 589.3 nm in a range of from about 1.4 to about 1.6, for example, from about 1.47 to about 1.50. The stress optical coefficient is about 3.2 nm/MPa/cm, for example, 3.253 nm/MPa/cm in some embodiments. The density of the glass composition is in a range of from about 2.2 $g/cm^3$ to about 2.4 $cm^3$, for example, from about 2.249 $g/cm^3$ to about 2.393 $cm^3$.

The glass composition disclosed herein may have a strain point in a range of from about $520°$ C. to about $700°$ C., for example, from about $522°$ C. to about $651°$ C. The annealing point may be in a range of from about $550°$ C. to about $750°$ C., for example, from about $580°$ C. to about $705°$ C. The glass composition may have a softening point in a range of from about $800°$ C. to about $1,050°$ C., for example, from about $835°$ C. to about $1,025°$ C.

The glass compositions disclosed herein also provide good toughness. The fracture toughness $K_{IC}$ of the glass (in units of $MPa·m^{0.5}$) may be in a range from about 0.5 $MPa·m^{0.5}$ to about 1 $MPa·m^{0.5}$, for example, from about 0.5 $MPa·m^{0.5}$ to about 0.75 $MPa·m^{0.5}$.

The glass compositions may have a Poisson's ratio in a range of from 0.2 to about 0.3, for example, from 0.20 to about 0.23, a Young's modulus in a range of from about 50 GPa to about 80 GPa, for example, from about 53 GPa to about 73 GPa, and a shear modulus in a range of from about 20 GPa to about 40 GPa, for example, from about 20 GPa to about 30 GPa, In another aspect, the present disclosure also provides a method of making and a method of using the glass composition described herein, a glass article (or component) comprising such a glass composition, and a display device comprising the glass composition or a glass article having the glass composition.

Examples of a glass article include, but are not limited to a panel, a substrate, a cover, a backplane, or any other components used in an electronic device for display applications. In some embodiments, the glass article such as a substrate or a panel is optically transparent. Examples of the glass article include, but are not limited to, a flat or curved glass panel.

For example, in some embodiments, the glass composition or the glass substrate is a cover or backplane in an electronic device. In some embodiments, thin film resistors are built on or in contact with the glass composition. The thin film resistors may be amorphous silicon based or poly-crystalline silicon based. In some embodiments, the glass composition provided in the present disclosure is used as a substrate or a layer, in or on which amorphous silicon based transistors are disposed. Examples of the electronic devices include, but are not limited to, liquid crystal display (LCD), light emitting diode (LED) display, computer monitors, automated teller machines (ATMs), touch screen, and photovoltaic devices.

EXAMPLES

The following examples are set forth below to illustrate the methods and results according to the disclosed subject matter. These examples are not intended to be inclusive of all embodiments of the subject matter disclosed herein, but rather to illustrate representative methods and results. These examples are not intended to exclude equivalents and variations of the present disclosure which are apparent to one skilled in the art.

Efforts have been made to ensure accuracy with respect to numbers (e.g., amounts, temperature, etc.) but some errors and deviations should be accounted for. Unless indicated otherwise, temperature is in ° C. or is at ambient temperature, and pressure is at or near atmospheric. The compositions themselves are given in mole percent on an oxide basis and have been normalized to 100%. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

The glass properties set forth in the tables were determined in accordance with techniques conventional in the glass art. Thus, the linear coefficient of thermal expansion (CTE) over the temperature range 25-300° C. is expressed in terms of $\times 10^{-7}/° C.$, and the annealing point is expressed in terms of ° C. The CTE was determined following ASTM standard E228. The annealing point and strain point were determined from beam bending viscosity measurement technique following ASTM standard C598, unless expressly indicated otherwise. The density in terms of grams/cm$^3$ was measured via the Archimedes method (ASTM C693). The melting temperature in terms of ° C. (defined as the temperature at which the glass melt demonstrates a viscosity of 200 poises) was calculated employing a Fulcher equation fit to high temperature viscosity data measured via rotating cylinders viscometry (ASTM C965-81).

The liquidus temperature of the glass in terms of ° C. was measured using the standard gradient boat liquidus method of ASTM C829-81. This involves placing crushed glass particles in a platinum boat, placing the boat in a furnace having a region of gradient temperatures, heating the boat in an appropriate temperature region for 24 hours, and determining by means of microscopic examination the highest temperature at which crystals appear in the interior of the glass. More particularly, the glass sample is removed from the Pt boat in one piece and examined using polarized light microscopy to identify the location and nature of crystals which have formed against the Pt and air interfaces and in the interior of the sample. Because the gradient of the furnace is very well known, temperature vs. location can be well estimated, within 5-10° C. The temperature at which crystals are observed in the internal portion of the sample is taken to represent the liquidus of the glass (for the corresponding test period). Testing is sometimes carried out at longer times (e.g. 72 hours) to observe slower growing phases. The liquidus viscosity in poises was determined from the liquidus temperature and the coefficients of the Fulcher equation.

Young's modulus values and shear modulus in terms of GPa, and Poisson's ratio were determined using a resonant ultrasonic spectroscopy technique of the general type set forth in ASTM E1875-00e1.

Stress optical coefficient (SOC) values can be measured as set forth in Procedure C (Glass Disc Method) of ASTM standard C770-16, entitled "Standard Test Method for Measurement of Glass Stress-Optical Coefficient."

The exemplary glasses of the Tables were prepared using a commercial sand as a silica source, milled such that 90% by weight passed through a standard U.S. 100 mesh sieve. Alumina was the alumina source, periclase was the source for MgO, and tin (IV) oxide was the source for $SnO_2$. The raw materials were thoroughly mixed, and double melted in crucibles. The raw materials can be also mixed and then loaded into a platinum vessel suspended in a furnace heated by silicon carbide glowbars, melted and stirred for several hours at temperatures between 1600 and 1650° C., and delivered through an orifice at the base of the platinum vessel. The mixing and double melting procedures ensured homogeneity. The resulting patties of glass were annealed at or near the annealing point, and then subjected to various experimental methods to determine physical, viscous and liquidus attributes.

These methods are not unique, and the glass compositions can be prepared using standard methods well-known to those skilled in the art. Such methods include a continuous melting process, such as would be performed in a continuous melting process, wherein the melter used in the continuous melting process is heated by gas, by electric power, or combinations thereof.

Raw materials appropriate for producing exemplary glasses include commercially available sands as sources for $SiO_2$; alumina, aluminum hydroxide, hydrated forms of alumina, and various aluminosilicates, nitrates and halides as sources for $Al_2O_3$; boric acid, anhydrous boric acid and boric oxide as sources for $B_2O_3$; periclase, magnesia, magnesium carbonate, magnesium hydroxide, and various forms of magnesium silicates, aluminosilicates, nitrates and halides as sources for MgO. If a chemical fining agent is desired, tin can be added as $SnO_2$, as a mixed oxide with another major glass component, or in oxidizing conditions as SnO, tin oxalate, tin halide, or other compounds of tin known to those skilled in the art.

The exemplary glass compositions contain $SnO_2$ as a fining agent, but other chemical fining agents could also be employed to obtain glass of sufficient quality for TFT substrate applications.

In addition to the elements deliberately incorporated into exemplary glasses, nearly all stable elements in the periodic table are present in glasses at some level, either through low levels of contamination in the raw materials, through high-temperature erosion of refractories and precious metals in the manufacturing process, or through deliberate introduction at low levels to fine tune the attributes of the final glass.

Hydrogen is inevitably present in the form of the hydroxyl anion, $OH^-$, and its presence can be ascertained via standard infrared spectroscopy techniques. Dissolved hydroxyl ions significantly and nonlinearly impact the annealing point of exemplary glasses, and thus to obtain the desired annealing point it may be necessary to adjust the concentrations of major oxide components so as to compensate. Hydroxyl ion concentration can be controlled to some extent through choice of raw materials or choice of melting system. For example, boric acid is a major source of hydroxyls, and replacing boric acid with boric oxide can be a useful means to control hydroxyl concentration in the final glass. The same reasoning applies to other potential raw materials comprising hydroxyl ions, hydrates, or compounds comprising physisorbed or chemisorbed water molecules. If burners are used in the melting process, then hydroxyl ions can also be introduced through the combustion products from combustion of natural gas and related hydrocarbons, and thus it may be desirable to shift the energy used in melting from burners to electrodes to compensate. Alternatively, one might instead employ an iterative process of adjusting major oxide components so as to compensate for the deleterious impact of dissolved hydroxyl ions.

Sulfur is often present in natural gas, and likewise is a tramp component in many carbonate, nitrate, halide, and oxide raw materials. In the form of $SO_2$, sulfur can be a troublesome source of gaseous inclusions. The tendency to form $SO_2$-rich defects can be managed to a significant degree by controlling sulfur levels in the raw materials, and by incorporating low levels of comparatively reduced multivalent cations into the glass matrix. While not wishing to be bound by theory, it appears that $SO_2$-rich gaseous inclusions arise primarily through reduction of sulfate ($SO_4^=$) dissolved in the glass.

Deliberately controlling sulfur levels in raw materials to a low level is a useful means of reducing dissolved sulfur (presumably as sulfate) in the glass. In particular, sulfur is preferably less than 200 ppm by weight in the batch materials, and more preferably less than 100 ppm by weight in the batch materials.

Reduced multivalents can also be used to control the tendency of exemplary glasses to form $SO_2$ blisters. While not wishing to be bound to theory, these elements behave as potential electron donors that suppress the electromotive force for sulfate reduction. Sulfate reduction can be written in terms of a half reaction such as $$SO_4^- \rightarrow SO_2 + O_2 + 2e^-$$

where $e^-$ denotes an electron. The "equilibrium constant" for the half reaction is $$K_{eq} = [SO_2][O_2][e^-]^2 / [SO_4^-]$$

where the brackets denote chemical activities. Ideally one would like to force the reaction so as to create sulfate from $SO_2$, $O_2$ and $2e^-$. Adding nitrates, peroxides, or other oxygen-rich raw materials may help, but also may work against sulfate reduction in the early stages of melting, which may counteract the benefits of adding them in the first place. $SO_2$ has very low solubility in most glasses, and so is impractical to add to the glass melting process. Electrons may be "added" through reduced multivalents. For example, an appropriate electron-donating half reaction for ferrous iron ($Fe^{2+}$) is expressed as $$2Fe^{2+} \rightarrow 2Fe^{3+} + 2e^-$$

This "activity" of electrons can force the sulfate reduction reaction to the left, stabilizing $SO_4^=$ in the glass. Suitable reduced multivalents include, but are not limited to, $Fe^{2+}$, $Mn^{2+}$, $Sn^{2+}$, $Sb^{3+}$, $As^{3+}$, $V^{3+}$, $Ti^{3+}$, and others familiar to those skilled in the art. In each case, it may be important to minimize the concentrations of such components so as to avoid deleterious impact on color of the glass, or in the case of As and Sb, to avoid adding such components at a high enough level so as to complication of waste management in an end-user's process.

In addition to the major oxides components of exemplary glasses, and the minor or tramp constituents noted above, halides may be present at various levels, either as contaminants introduced through the choice of raw materials, or as deliberate components used to eliminate gaseous inclusions in the glass. As a fining agent, halides may be incorporated at a level of about 0.4 mol. % or less, though it is generally desirable to use lower amounts if possible to avoid corrosion of off-gas handling equipment. In some embodiments, the concentrations of individual halide elements are below about 200 ppm by weight for each individual halide, or below about 800 ppm by weight for the sum of all halide elements.

Tables 1-5 summarizes the composition and properties of 21 experimental samples. Table 1 shows the compositions of Experimental Examples 1-5 ("Ex. 1-5"). Table 2 shows the compositions of Experimental Examples 6-10 ("Ex. 6-10"). Table 3 shows the compositions of Experimental Examples 11-15 ("Ex. 11-15"). Table 4 shows the compositions of Experimental Examples 16-21 ("Ex. 16-21"). Examples 1-21 are also labelled in an order of from "A" to "X." The property data of Examples 1-21 including softening point, annealing point, Young's modulus, shear modulus, and Poisson's ratio are also listed in Tables 1-4.

TABLE 1

|  | Ex. 1 | Ex. 2 | Ex. 3 | Ex. 4 | Ex. 5 |
|---|---|---|---|---|---|
| Analyzed (mol. %) | A | B | C | D | E |
| $SiO_2$ | 71.9 | 69.0 | 66.7 | 69.9 | 67.0 |
| $Al_2O_3$ | 10.4 | 10.3 | 10.4 | 9.9 | 10.1 |
| $B_2O_3$ | 10.2 | 10.1 | 9.4 | 9.1 | 9.7 |
| $K_2O$ | 7.3 | 10.3 | 13.2 | 7.9 | 9.8 |

TABLE 1-continued

| | Ex. 1 | Ex. 2 | Ex. 3 | Ex. 4 | Ex. 5 |
|---|---|---|---|---|---|
| MgO | 0.0 | 0.0 | 0.0 | 2.9 | 3.1 |
| $SnO_2$ | 0.1 | 0.1 | 0.1 | 0.1 | 0.1 |
| Sum | 100 | 100 | 100 | 100 | 100 |
| $K_2O/Al_2O_3$ | 0.71 | 1.00 | 1.27 | 0.80 | 0.98 |
| $MgO/Al_2O_3$ | 0.00 | 0.00 | 0.00 | 0.29 | 0.31 |
| Refractive Index (at 589.3 nm) | 1.4809 | 1.4820 | 1.4925 | | |
| Stress Optic Coefficient (nm/MPa/cm) | | | | | |
| Density ($g/cm^3$) | 2.249 | 2.288 | 2.354 | 2.293 | 2.320 |
| Strain Point (° C., BBV) | | | 577 | 572 | |
| Annealing Point (° C., BBV) | | | 629 | 621 | |
| Softening Point (° C., PPV) | 1022 | 980 | 865 | | |
| CTE ($10^{-7}$/° C.) | | | | | |
| Poisson's Ratio (RUS) | 0.217 | 0.218 | 0.216 | 0.219 | 0.221 |
| E (Young's Modulus, GPa, RUS) | 57.0 | 530.1 | 59.1 | 59.6 | 57.2 |
| G (Shear Modulus, GPa, RUS) | 23.4 | 21.8 | 24.3 | 24.5 | 23.4 |

TABLE 2

| | Ex. 6 | Ex. 7 | Ex. 8 | Ex. 9 | Ex. 10 |
|---|---|---|---|---|---|
| Analyzed (mol. %) | F | G | H | I | J |
| $SiO_2$ | 66.4 | 64.8 | 68.2 | 66.2 | 62.1 |
| $Al_2O_3$ | 10.4 | 10.3 | 9.8 | 9.8 | 9.8 |
| $B_2O_3$ | 8.2 | 8.2 | 9.2 | 8.7 | 9.0 |
| $K_2O$ | 12.3 | 13.3 | 6.7 | 9.4 | 12.7 |
| MgO | 2.5 | 3.0 | 5.9 | 5.7 | 6.1 |
| $SnO_2$ | 0.1 | 0.1 | 0.1 | 0.1 | 0.1 |
| Sum | 100 | 100 | 100 | 100 | 100 |
| $K_2O/Al_2O_3$ | 1.19 | 1.29 | 0.68 | 0.96 | 1.29 |
| $MgO/Al_2O_3$ | 0.24 | 0.29 | 0.61 | 0.58 | 0.61 |
| Refractive Index (at 589.3 nm) | | | | | 1.4714 |
| Stress Optic Coefficient (nm/MPa/cm) | | | | | |
| Density ($g/cm^3$) | 2.356 | 2.387 | 2.320 | 2.343 | 2.371 |
| Strain Point (° C., BBV) | | | | | 577 |
| Annealing Point (° C., BBV) | | | | | 626 |
| Softening Point (° C., PPV) | | | | | 866 |
| CTE ($10^{-7}$/° C.) | | | | | |
| Poisson's Ratio (RUS) | | 0.223 | 0.220 | 0.218 | 0.225 |
| E (Young's Modulus, GPa, RUS) | | 60.1 | 62.3 | 58.7 | 60.2 |
| G (Shear Modulus, GPa, RUS) | | 24.6 | 25.5 | 24.1 | 24.5 |

TABLE 3

| | Ex. 11 | Ex. 12 | Ex. 13 | Ex. 14 | Ex. 15 |
|---|---|---|---|---|---|
| Analyzed (mol. %) | K | L | M | N | O |
| $SiO_2$ | 60.9 | 70.5 | 70.5 | 66.6 | 67.3 |
| $Al_2O_3$ | 9.7 | 9.7 | 9.0 | 9.7 | 10.2 |
| $B_2O_3$ | 8.4 | 9.7 | 7.5 | 4.9 | 9.3 |
| $K_2O$ | 15.0 | 3.8 | 12.8 | 12.6 | 3.8 |

TABLE 3-continued

|  | Ex. 11 | Ex. 12 | Ex. 13 | Ex. 14 | Ex. 15 |
|---|---|---|---|---|---|
| MgO | 5.8 | 6.0 | 0.0 | 5.9 | 9.2 |
| $SnO_2$ | 0.1 | 0.1 | 0.1 | 0.1 | 0.1 |
| Sum | 100 | 100 | 100 | 100 | 100 |
| $K_2O/Al_2O_3$ | 1.54 | 0.40 | 1.41 | 1.30 | 0.37 |
| $MgO/Al_2O_3$ | 0.60 | 0.62 | 0.00 | 0.61 | 0.91 |
| Refractive Index (at 589.3 nm) |  | 1.4884 | 1.4913 | 1.4962 | 1.4946 |
| Stress Optic Coefficient (nm/MPa/cm) |  |  |  | 3.253 |  |
| Density ($g/cm^3$) | 2.393 | 2.290 | 2.362 | 2.389 | 2.327 |
| Strain Point (° C., BBV) | 569 | 642 |  | 605 | 651 |
| Annealing Point (° C., BBV) | 618 | 699 |  | 663 | 704 |
| Softening Point (° C., PPV) | 838 |  |  | 956 |  |
| CTE ($10^{-7}/°$ C.) |  |  |  | 80.5 | 40.0 |
| Poisson's Ratio (RUS) | 0.221 | 0.217 | 0.206 | 0.218 | 0.221 |
| E (Young's Modulus, GPa, RUS) | 59.9 | 65.3 | 62.3 | 63.0 | 68.3 |
| G (Shear Modulus, GPa, RUS) | 24.5 | 26.8 | 25.9 | 25.9 | 27.9 |

TABLE 4

|  | Ex. 16 | Ex. 17 | Ex. 18 | Ex. 19 | Ex. 20 | Ex. 21 |
|---|---|---|---|---|---|---|
| Analyzed (mol. %) | P | Q | R | S | T | U |
| $SiO_2$ | 72.3 | 69.5 | 65.5 | 67.7 | 67.7 | 68.5 |
| $Al_2O_3$ | 10.4 | 10.4 | 11.7 | 6.7 | 3.7 | 0.01 |
| $B_2O_3$ | 10.2 | 10.1 | 11.5 | 9.7 | 9.7 | 9.53 |
| $K_2O$ | 6.9 | 9.7 | 11.0 | 3.8 | 3.8 | 3.52 |
| MgO | 0.0 | 0.0 | 0.0 | 12.0 | 15.0 | 18.23 |
| $SnO_2$ | 0.1 | 0.1 | 0.1 | 0.1 | 0.1 | 0.11 |
| Sum | 100 | 100 | 100 | 100 | 100 | 100 |
| $K_2O/Al_2O_3$ | 0.66 | 0.94 | 0.95 | 0.57 | 1.03 | 352.0 |
| $MgO/Al_2O_3$ | 0.0 | 0.0 | 0.0 | 1.79 | 4.05 | 1823.0 |
| Refractive Index (at 589.3 nm) |  |  | 1.4829 | 1.4836 | 1.4860 | 1.5001 |
| Stress Optic Coefficient (nm/MPa/cm) |  |  |  |  |  |  |
| Density ($g/cm^3$) | 2.278 | 2.287 | 2.304 |  |  | 2.363 |
| Strain Point (° C., BBV) | 563 | 534 | 522 |  |  | 596 |
| Annealing Point (° C., BBV) | 633 | 606 | 589 |  |  | 638 |
| Softening Point (° C., PPV) | 993 | 978 | 945 |  |  | 845 |
| CTE ($10^{-7}/°$ C.) | 49.0 | 70.0 | 76.1 |  |  | 47.0 |
| Poisson's Ratio (RUS) | 0.217 | 0.222 | 0.227 |  |  | 0.216 |
| E (Young's Modulus, GPa, RUS) | 58.1 | 54.4 | 53.3 |  |  | 72.3 |
| G (Shear Modulus, GPa, RUS) | 23.9 | 22.3 | 21.7 |  |  | 29.7 |
| Fracture toughness (MPa * $m^{1/2}$) | 0.69 | 0.58 | 0.59 |  |  | 0.76 |
| Fracture toughness (stdev) | 0.01 | 0.01 | 0.02 |  |  | 0.02 |
| Fracture Toughness (COV) | 2.0 | 1.7 | 2.9 |  |  | 2.5 |
| Internal Liquidus Temperature (° C.) | >1305 | <950 | <950 |  |  | 1295 |
| Liquidus Phase | Mullite |  |  |  |  | Forsterite |

In Table 4, "COV" is the coefficient of variation for the fracture toughness data.

Figure 2:
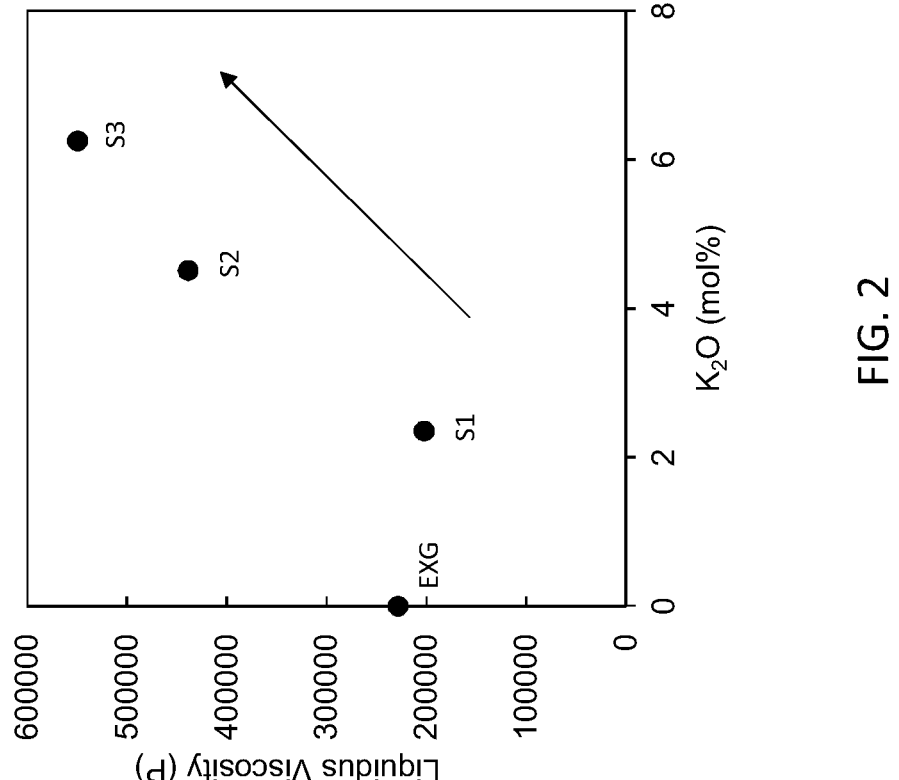
FIG. 2 graphically depicts the relationship between the content of alkali oxide (e.g., $K_2O$) and the liquidus viscosity of exemplary compositions in accordance with some embodiments.

FIG. 1 illustrates a general trend showing the effect of the content of $K_2O$ on the liquidus temperature of the composition disclosed herein. FIG. 2 illustrates the relationship between the content of $K_2O$ and the liquidus viscosity as a general trend for the composition disclosed herein. In FIGS. 1-2, experimental samples 1-3 ("S1," "S2," "S3") are compared to a comparative product, which is commercially available from Corning Inc. under tradename EAGLE XG ("EXG") and contains no $K_2O$. EAGLE XG may not include comparable other ingredients, and is shown herein for illustration only. The product EXG has a liquidus temperature of 1140° C. and a liquidus viscosity of 228,527 poise.

The glass composition has a liquidus viscosity equal to or higher than 100 kPoise. For example, the liquidus viscosity can be adjusted to be in a range of about 200 kPoise to about 400 kPoise, about 200 kPoise to about 600 kPoise, about 100 kPoise to about 550 kPoise, or about 200 kPoise to about 450 kPoise. Such an increase in liquidus viscosity and such a decrease in liquidus temperature provide significant processing advantages and decrease manufacturing cost.

Referring to Tables 1-5, the glass composition has a coefficient of thermal expansion (CTE) in an adjustable range. The exemplary glasses have good properties such as annealing point and Young's modulus values that make the glasses suitable for display applications, such as AMLCD substrate applications, and more particularly for low-temperature polysilicon and oxide thin film transistor applications. The glasses have durabilities in acid and base media that are similar to those obtained from commercial AMLCD substrates, and thus are appropriate for AMLCD applications. The exemplary glasses can be formed using downdraw techniques, and in particular are compatible with the fusion process.

Further, despite a significant level of alkali metal oxide used, no metal ions such as alkali metal ions are leached or diffused out from the glass compositions when the compositions are used in electronic devices.

Although the subject matter has been described in terms of exemplary embodiments, it is not limited thereto. Rather, the appended claims should be construed broadly, to include other variants and embodiments, which may be made by those skilled in the art.

What is claimed:

1. A glass composition consisting essentially of:
about 60 mol. % to about 80 mol. % $SiO_2$;
2 mol. % to about 11 mol. % $Al_2O_3$;
about 4.0 mol. % to about 12 mol. % $B_2O_3$;
about 0.5 mol. % to about 10 mol. % $K_2O$;
0 mol. % to about 18.5 mol. % MgO; and
0 mol. % to about 1 mol. % $SnO_2$,
wherein a molar ratio of $SiO_2/B_2O_3$ is in a range of about 6 to about 15.

2. The glass composition of claim 1, wherein $Al_2O_3$ has a content in a range of from about 4 mol. % to about 10.5 mol. %.

3. The glass composition of claim 1, wherein $K_2O$ has a content in a range of from about 3 mol. % to 10 mol. %.

4. The glass composition of claim 1, wherein $SiO_2$ has a content in a range of from about 65 mol. % to 75 about mol. %.

5. The glass composition of claim 1, wherein MgO has a content in a range of from about 10 mol. % to about 18.5 mol. %.

6. The glass composition of claim 1, wherein $B_2O_3$ has a content in a range of from about 8 mol. % to about 11 mol. %.

7. The glass composition of claim 1, wherein $SnO_2$ has a content in a range of from about 0.05 mol. % to about 0.15 mol. %.

8. The glass composition of claim 1, wherein a molar ratio of $K_2O/Al_2O_3$ is in a range of from about 0.4 to about 360.

9. The glass composition of claim 1, wherein a molar ratio of $MgO/Al_2O_3$ is in a range of 0 to about 10.

10. The glass composition of claim 1, wherein a molar ratio of $MgO/Al_2O_3$ is in a range of 0 to about 4.

11. The glass composition of claim 1, wherein a R' value defined as $([K_2O]—[Al_2O_3])/[B_2O_3]$ is in a range of from about −0.7 to about 0.7, and a R" value defined as $([K_2O]+0.5*[MgO]—[Al_2O_3])/[B_2O_3]$ is in a range of from about −0.3 to about 1.3, wherein $[K_2O]$, $[MgO]$, $[Al_2O_3]$, and $[B_2O_3]$ each respectively represent a molar content of $K_2O$, MgO, $Al_2O_3$, and $B_2O_3$.

12. The glass composition of claim 1, wherein the glass composition has a coefficient of thermal expansion in a range of from about $40×10^{-7}/°$ C. to about $85×10^{-7}/°$ C. at a temperature from 20° C. to 300° C.

13. A glass composition consisting essentially of:
about 60 mol. % to about 75 mol. % $SiO_2$;
about 4 mol. % to about 10.5 mol. % $Al_2O_3$;
about 5 mol. % to about 11 mol. % $B_2O_3$;
about 3.5 mol. % to about 10 mol. % $K_2O$;
0 mol. % to about 6 mol. % MgO; and
0 mol. % to about 1 mol. % $SnO_2$,
wherein a molar ratio of $K_2O/Al_2O_3$ is in a range of from about 0.4 to about 2, and a molar ratio of $MgO/Al_2O_3$ is in a range of 0 to about 4.

14. The glass composition of claim 13, wherein a molar ratio of $SiO_2/B_2O_3$ is in a range of about 6 to about 15.

15. The glass composition of claim 13, wherein a R' value defined as $([K_2O]—[Al_2O_3])/[B_2O_3]$ is in a range of from about −0.7 to about 0.7, and a R" value defined as $([K_2O]+0.5*[MgO]—[Al_2O_3])/[B_2O_3]$ is in a range of from about −0.3 to about 1.3, wherein $[K_2O]$, $[MgO]$, $[Al_2O_3]$, and $[B_2O_3]$ each respectively represent a molar content of $K_2O$, MgO, $Al_2O_3$, and $B_2O_3$.

16. A glass article comprising the glass composition of claim 1.

17. A display device comprising the glass composition of claim 1 or a glass substrate comprising the glass composition of claim 1.

18. The display device of claim 17, wherein the glass composition or the glass substrate is a cover or backplane in an electronic device for display application.

19. A display device comprising the glass composition of claim 13 or a glass article comprising the glass composition of claim 13.

20. A glass composition consisting essentially of:
about 60 mol. % to about 80 mol. % $SiO_2$;
2 mol. % to about 11 mol. % $Al_2O_3$;
about 4.0 mol. % to about 12 mol. % $B_2O_3$;
about 0.5 mol. % to about 10 mol. % $K_2O$;
0 mol. % to about 18.5 mol. % MgO; and
0 mol. % to about 1 mol. % $SnO_2$,
wherein a R' value defined as $([K_2O]—[Al_2O_3])/[B_2O_3]$ is in a range of from about −0.7 to about 0.7, and a R" value defined as $([K_2O]+0.5*[MgO]—[Al_2O_3])/[B_2O_3]$ is in a range of from about −0.3 to about 1.3, wherein $[K_2O]$, $[MgO]$, $[Al_2O_3]$, and $[B_2O_3]$ each respectively represent a molar content of $K_2O$, MgO, $Al_2O_3$, and $B_2O_3$.

* * * * *